Jan. 14, 1969     R. H. LEGATTI     3,422,314
PROTECTIVE CIRCUIT

Filed May 25, 1966     Sheet 1 of 4

INVENTOR.
RAYMOND H. LEGATTI
BY Alfred E. Page
ATTORNEY.

INVENTOR.
RAYMOND H. LEGATTI
BY
Alfred E Page
ATTORNEY.

United States Patent Office 3,422,314
Patented Jan. 14, 1969

3,422,314
PROTECTIVE CIRCUIT
Raymond H. Legatti, Cherokee Drive,
Moultrie, Ga. 31768
Filed May 25, 1966, Ser. No. 552,780
U.S. Cl. 317—19
Int. Cl. H02h 3/00; H02h 7/00; H02h 3/28
12 Claims

ABSTRACT OF THE DISCLOSURE

A protective monitor, operable to energize the trip coil of a circuit breaker to interrupt the supply of power from a source of polyphase A.C. power to a load responsive to variation of any phase voltage and variation of frequency, includes a silicon controlled rectifier in association with a condenser for energizing the trip coil of the circuit breaker. A unijunction transistor controls gating of the SCR. Over-voltage sensing means and under-voltage sensing means are connected to each phase of the load, the over-voltage sensing means responding to variations in an increasing direction from a preselected value of the load voltage in any phase, and independently of the load voltage in the other phases, to provide an output signal. The under-voltage sensing means responds to decreases from the preselected value of the load voltage in any phase, and independently of the load voltage in the other phases, to provide an output signal. Separate amplifiers are provided for the over-voltage sensing means and the under-voltage sensing means but commonly control conduction of the unijunction transistor. The monitor includes a saturated toroid having a core of square loop material, a primary or input winding connected to one phase of the load and a secondary or output winding. A full wave rectifier is connected across the secondary or output winding, and two separate amplifiers are connected to the output diagonal of the full wave rectifier. One amplifier provides an output signal responsive to a decrease in frequency and the other amplifier provides an output responsive to an increase in frequency and both amplifiers are connected to the unijunction transistor to trigger the same conductive to gate the SCR.

---

This invention relates to a protective circuitry and, more particularly, to a novel protective circuit capable of protecting a load with respect to over-voltage, under-voltage, over-frequency and under-frequency by monitoring the voltage and frequency.

There are many instances in which it is necessary to disconnect the power supply to a sensitive and/or expensive load in the event of variations of input voltage or input frequency either above or below a preset value. Hitherto, this has generally been accomplished by separate voltage responsive circuits and frequency responsive circuits. Difficulties have been encountered in providing a protective system, where there is a polyphase input of power, in protecting with respect to variations in voltage and frequency of the individual phases. Also, many known circuits are responsive to the average voltage or average frequency rather than being responsive to the peak voltage in a phase, for example. Consequently, not only have prior art arrangements been relatively complicated and expensive, but they have not been as sensitive as required for protecting a sensitive and expensive load by interrupting the power supply when the voltage or frequency varies from preselected values.

An object of the present invention is to provide a single protective circuit or monitor for protecting a load by interrupting the power supply responsive to a variation in either voltage of frequency from preselected values.

Another object of the invention is to provide a protective circuit or monitor for a load which is supplied from a polyphase source, such as a three-phase source, and which is responsive to variation from a preset value of either the voltage or the frequency, in any one of the phases, to interrupt the power supply to the load.

A further object of the invention is to provide such a protective circuit or monitor which is responsive to the peak voltage in any one of the several phases, such as any one of the three phases of a three-phase power supply.

Yet another object of the invention is to provide such a protective circuit or monitor using solid state components.

A further object of the invention is to provide such a monitor in which an error signal gates a silicon controlled rectifier, known as an SCR, to discharge a condenser which is charged to a voltage value sufficient to provide for several operations of a circuit breaker trip coil.

Still another object of the invention is to provide a protective system or monitor of the type mentioned and which is simple and compact in construction, has a long life and is reliable and efficient.

For an understanding of the principles of the invention, reference is made to the following description of a typical embodiment of the invention as illustrated in the accompanying drawings.

Figure 3A:
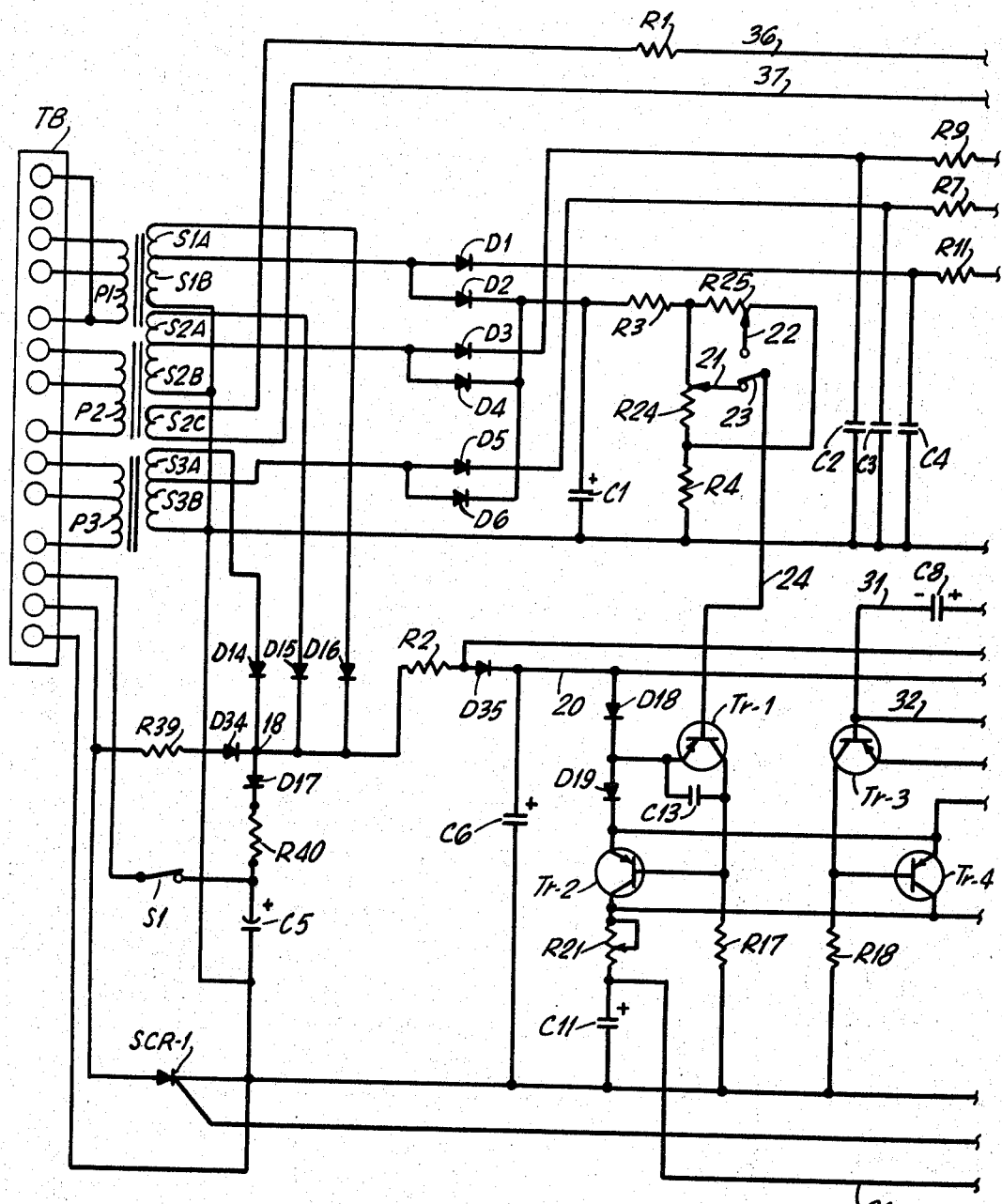
Figure 3B:
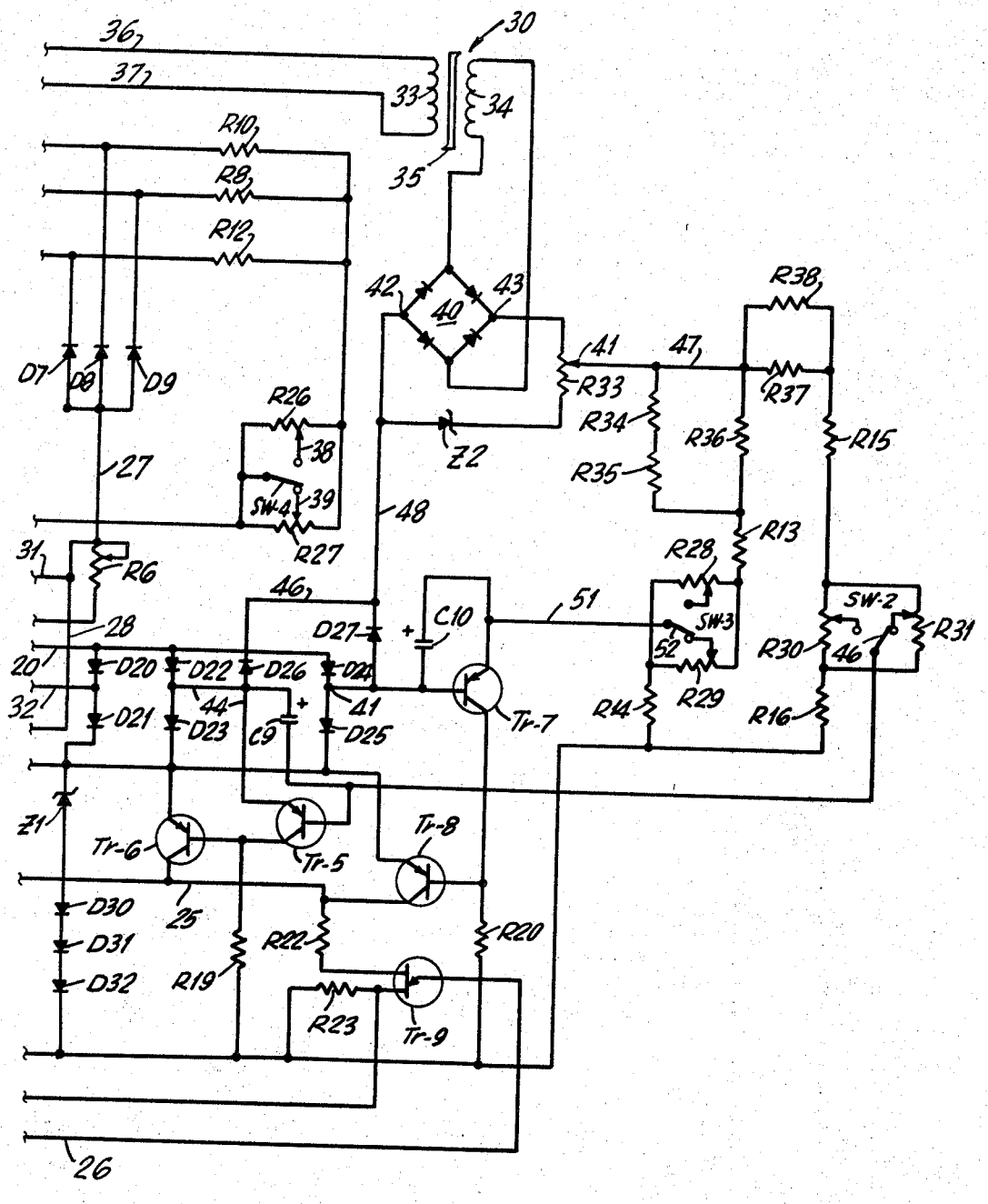
Figure 4:
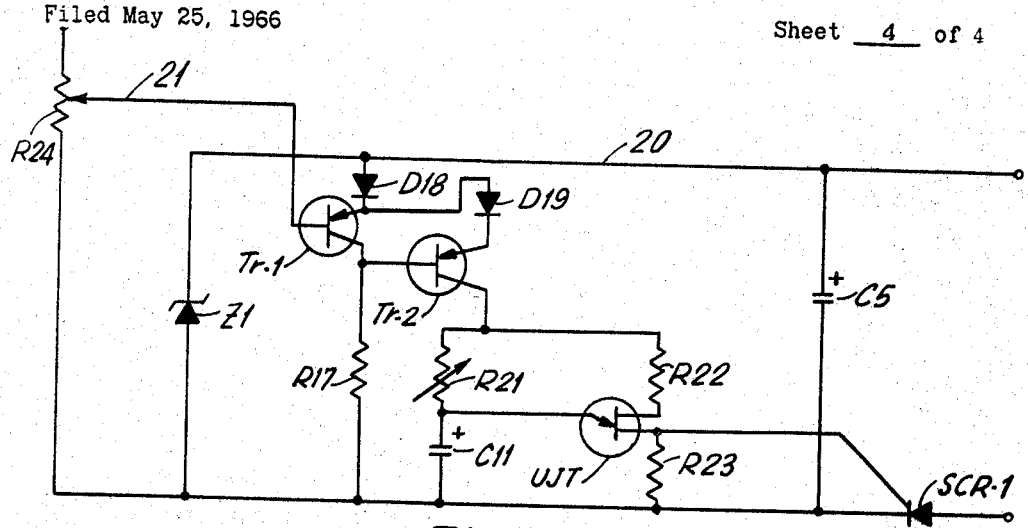
Figure 5:
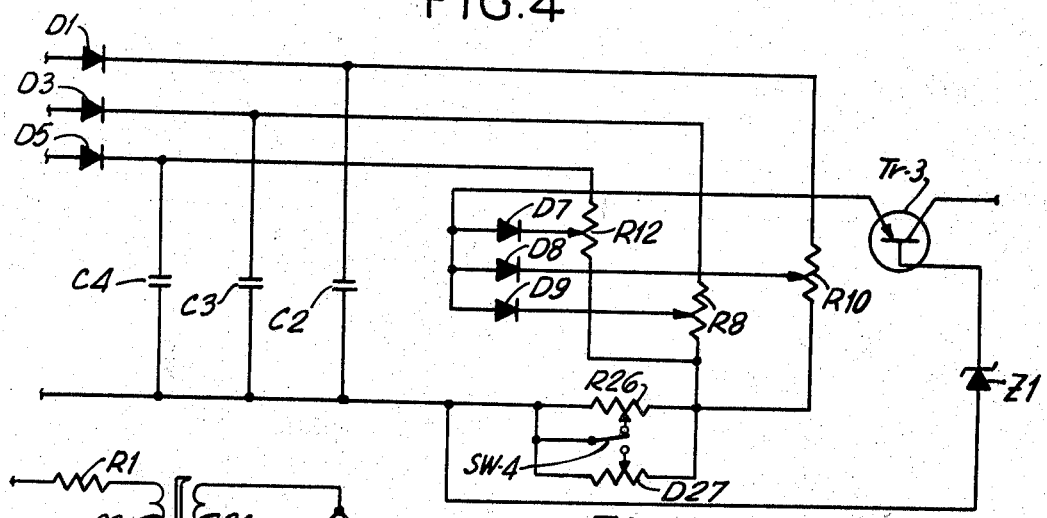
Figure 6:
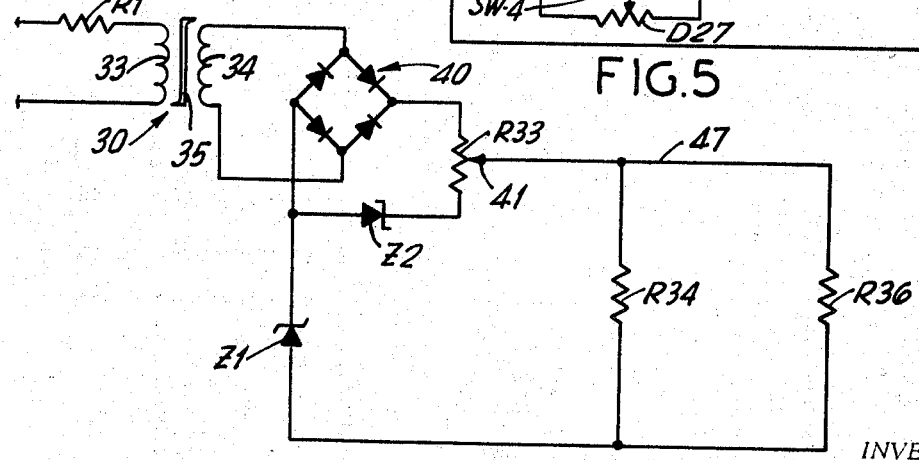

FIGS. 3A and 3B, combined, are a schematic wiring diagram of the complete protective circuit embodying the invention;

FIG. 4 is a schematic diagram of the overall protection circuit included in the circuit of FIG. 3;

FIG. 5 is a schematic wiring diagram of the under-voltage protection subcircuit of FIG. 3; and FIG. 6 is a schematic wiring diagram of the frequency protection subcircuit of FIG. 3.

Figure 1:
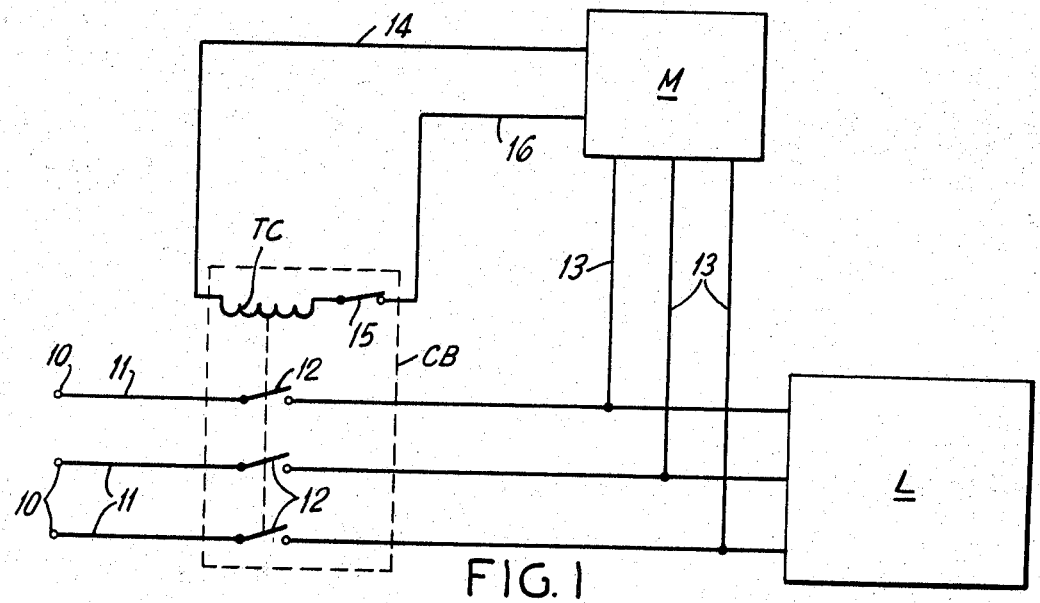
FIG. 1 is a schematic block diagram illustrating the protective circuit of the invention as controlling a three-phase power supply to a load.

Referring first to the schematic block diagram of FIG. 1, the protective device or monitor M is illustrated as monitoring or controlling the supply of power from a three-phase A.C. source, connected to terminals 10, to an expensive and/or sensitive load L. Terminals 10 are connected to load L through conductors 11 controlled by the contacts 12 of a circuit breaker CB. Circuit breaker CB is a three-phase circuit breaker provided with a shunt type trip out coil TC with a switch SW-1 in series therewith and opened when the circuit breaker trips.

As schematically illustrated by conductors 13, monitor M is connected to the supply lines or conductors 11 between circuit breaker CB and load L. Through the medium of conductors 14 and 16, monitor M controls the circuit breaker CB through the series circuit including the trip coil TC and the switch SW-1. Whenever either the voltage at the load or the frequency supplied to the load varies in either direction from a preselected value, monitor M energizes trip coil TC to open circuit breaker CB and interrupt the supply of power to load L.

Referring now to FIG. 3, the three-phase supply to monitor M, through conductors 13 tapped off from load conductors 11, is brought to a terminal board TB to which are also connected the conductors 14 and 16 leading to the tripping circuit for circuit breaker CB. Three transformers T1, T2, and T3 have primary windings P1, P2, and P3 connected to terminal board TB. Each primary winding P has associated therewith a secondary winding divided into two parts SA and SB. Each secondary winding SA produces a voltage which is twice the voltage at the output of the associated secondary winding SB. In the particular example illustrated, the lower voltage is 90 volts and the higher voltage is 180 volts, with the 90 volt output being used for signal purposes and the 180 volt output for actual control of circuit breaker CB through its strip coil TC.

Figure 2:
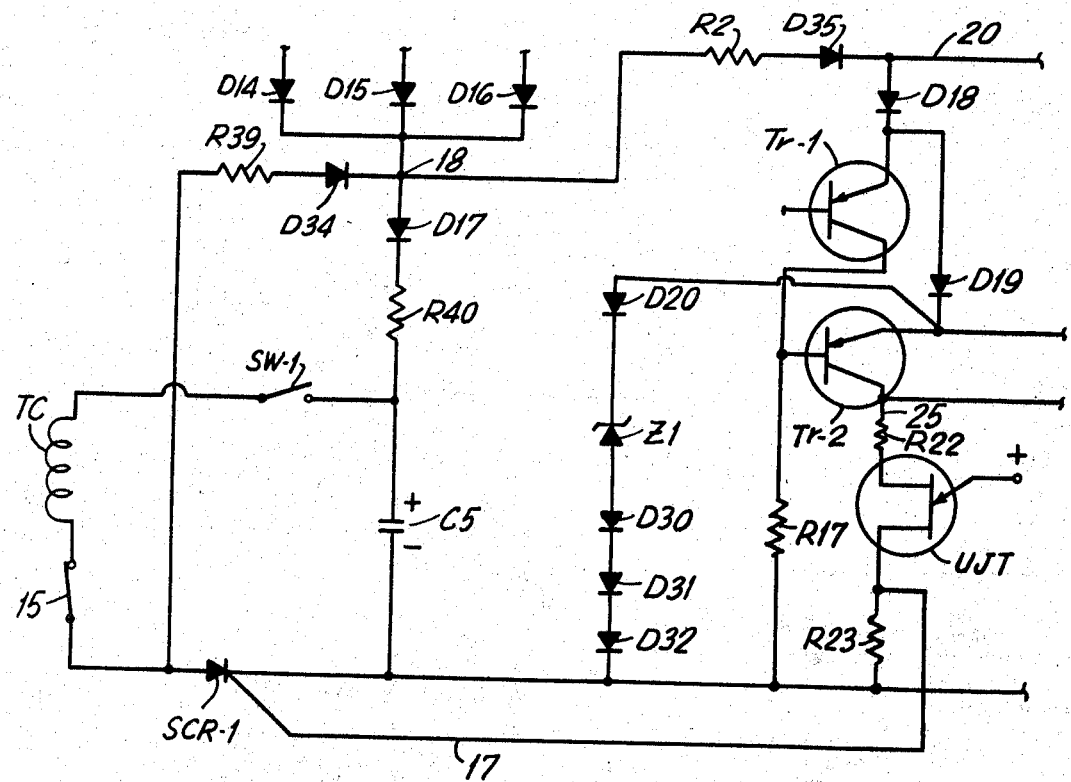
FIG. 2 is a partial schematic diagram illustrating the components included in the schematic block diagram of FIG. 1.

Monitor M includes four essentially similar transistor amplifiers, each of which is associated with a respective one of the four functions of the monitor or protective package. Referring to FIG. 2, which illustrates a typical one of these amplifiers, each amplifier comprises an odd-numbered transistor such as $Tr-1$ and an even-numbered transistor, such as $Tr-2$. When an odd-numbered transistor is conducting, it blocks the associated even-numbered transistor. When the odd-numbered transistor is blocked, the even-numbered transistor conducts.

When an even-numbered transistor conducts, it triggers a unijunction transistor UJT common to all of the amplifiers. When tht unijunction transistor UJT is triggered it gates, through a gating circuit 17, a silicon controlled rectifier SCR-1. As a result, a condenser C5, which is charged to 300 volts D.C., provides a current for energizing trip-out coil TC of circuit breaker provided with the shunt trip-out coil TC in series with a switch SW-1, the switch SW-1 being opened when circuit breaker CB trips. Condenser C5 stores enough energy so as to be able to trip circuit breaker CB three times.

The diodes D14, D15 and D16 are conntcted (FIG. 3) to the respective 180 volt A.C. terminals of the secondary windings S1A, S2A, and S3A. The cathodes of these diodes are commonly connected to a junction point 18 which is connected, through a series circuit including diode D17 and resistance R40, to the positive terminal of condenser C5. A reference bus 20 is provided which is common to the entire circuit, and bus 20 is maintained at a fixed positive potential by a circuit including a Zener diode Z1 and other diodes such as diodes D20 and D30 of FIG. 2. Resistance R2 is a limiting resistor for reference bus 20, being connected between reference bus 20 and junction point 18, there being a diode D35 connected in series between resistance R2 and reference bus 20.

While reference Zener diode Z1 plus temperature diodes D30, D31, D32 are connected to the common cathodes of diodes D19, D21, D23, D25 (FIG. 3), bus 20 is still the reference bus due to the low forward biased diodes D18 through D25.

A resistor R39 has one terminal connected to the anode of controlled rectifier SCR-1, and its other terminal connected to the junction point 18 through diode D34. Diode D17 in association with resistor R40 prevents a load being imposed on capacitor C5 and thereby prevents the latter from being discharged to any load circuit so that the capacitor will discharge only through controlled rectifier SCR-1 and shunt trip coil TC of circuit breaker CB. Resistor R40 limits the surge current to condenser C5 during charging thereof.

The combination of resistance R39 and diode D34 provides a potential to reference bus 20 in the event circuit breaker CB is opened so that, upon an attempt to reclose the circuit breaker CB, the under-voltage control described hereinafter will operate to energize trip coil TC and reopen circuit breaker CB. Diode D34 prevents backflow of current from diodes D14, D15 and D16 through resistor R39 to the anode of control rectifier SCR-1.

Turning now to the individual functions of monitor M, as illustrated in FIGS. 3 and 4, the over-voltage protection or monitoring circuit includes three diodes D2, D4 and D6 having their anodes connected to respective positive 90 volt terminals of the aforementioned secondary windings SB. The cathodes of these three diodes are commonly connected ot a voltage divider circuit including resistances R3, R4, R24 and R25. Resistance R24 is an adjustable resistance having a tap 21 connected to one terminal of a switch SW-1A and resistance 25 is likewise an adjustable resistance having an adjustable tap 22 connected to another terminal of switch SW-1A. The movable selector arm 23 is connected by a conductor 24 to the base of transistor Tr-1 and the emitter of this transistor is connected to reference bus 20 through an isolating diode D18.

Thus, with the base of transistor Tr-1 having a potential slightly less than the reference bus potential, which is the potential of its emitter, transistor Tr-1 will conduct and thus block transistor Tr-2. Should the voltage at the load increase, the base of transistor Tr-1 will become more positive than the emitter, and transistor Tr-1 will be blocked. This will permit transistsor Tr-2 to conduct. This transistor $Tr-2$ has its emitter connected to the reference bus through diodes D18 and D19 in series and its base is connected to the collector of transistor Tr-1.

The collector of transistor Tr-2 is connected to a conductor 25 which is connected, through a resistance R22, to one base electrode of unijunction transistor UJT whose other base electrode is connected to the gate of controlled rectifier SCR-1 through the conductor 17 as explained in connection with FIG. 2. The emitter of unijunction transistor UJT is connected by a conductor 26 to one end of a potentiometer R21 whose other end is connected to the collector of transistor Tr-2. Thus, when transistor Tr-2 conducts, unijunction transistor UJT is triggered conductive and gates controlled rectifier SCR-1 which, as stated, energizes the trip coil TC of circuit breaker CB.

It will be noted that the over-voltage circuit is responsive to the peak voltage in any one of the three different phases. The switch SW-1A is used to select the range of operation, and selection is possible by adjustment of either tap 21 or 22 or both taps, and by selective operation of the arm 23 of switch SW-1A.

The under-voltage control circuit differs somewhat from the over-voltage control circuit in that it is necessary to isolate the three phases. For this purpose, there are provided the diodes D1, D3 and D5 each having associated therewith a respective condenser C2, C3 and C4. Furthermore, each of these three diodes is associated with a resistor R9, R7 and R11, each of which connects the respective diode to the cathode of a respective diode D8, D9 and D7. The anodes of these latter three diodes are commonly connected, through a conductor 27, to an emitter biasing circuit for a transistor Tr-3. This emitter biasing circuit includes potentiometer R6 and condenser C8. In the under-voltage control circuit, the emitter of transistor Tr-3 is connected in common to the anodes of diodes D7, D8 and D9 through conductors 27 and 28. The base of transistor Tr-3 is connected, by a conductor 31, to condenser C8 and by a conductor 32 to the cathode of a diode D20 whose anode is connected to reference bus 20.

For the purpose of setting the range of under-voltage control, there are provided a pair of adjustable resistances R26 and R27 connected in parallel with each other and in series between the low voltage end of the 90 volt secondary winding S3B and the common junction of resistances R8, R10 and R12 each connected in series with a respective resistance R7, R9 and R11. The taps 38 and 39 of resistances R26 and R27, respectively, are connected to terminals selectively engageable by the selector arm 45 of switch SW-4, the described combination forming a voltage range adjustment for under-voltage control.

With the described circuit, when the voltage decreases below the preselected value, the emitter of transistor Tr-3 will become less positive than its base, or more negative than its base. Transistor Tr-3 will therefore be blocked. The collector of transistor Tr-3 is connected to the base of a transistor Tr-4, and the emitter of transistor Tr-4 is connected to reference bus 20 through diodes D20 and D21, which are in series with each other. Thus, when transistor Tr-3 is blocked, transistor Tr-4 will conduct. The collector of transistor Tr-4 is connected to conductor 25 and therefore unijunction transistor Tr-9 will be triggered to gate rectifier SCR-1 and energize trip coil TC of circuit breaker CB. It should be noted that the diodes D18 through D25 are isolating diodes to provide for separation of the four amplifiers from each other so that each amplifier can be adjusted independently of each other amplifier.

The under-frequency and over-frequency control circuits are essentially similar to the frequency monitor forming the subject matter of my copending patent application Ser. No. 543,243, filed Apr. 18, 1966, for "Frequency Meter or Monitor," with some slight modification. Thus, instead of the second full wave rectifier connected to the input to provide a reference voltage, the reference voltage in the frequency control circuits of FIGS. 3 and 6 is derived from reference bus 20. Also, instead of there being a meter or the like connected across the diagonal of the bridge circuit including, in the mentioned copending application, the two full wave rectifiers, this diagonal includes the over-frequency control circuit incorporating the transistors Tr–5 and Tr–6 and the under-frequency control circuit incorporating the transistors Tr–7 and Tr–8.

The two frequency control circuits include, in common, a saturated toroid 30 having a primary or input winding 33, a secondary or output winding 34 and a core 35 of square loop material and which is preferably a silicon steel core which is not subject to the very considerable temperature variations of square loop cores having a high nickel content. By the term "square loop" is meant a core material having a characteristic such that, when the magnetization is brought up to maximum saturation and returned, it returns substantially to the residual magnetization. With a silicon core, however, the average output follows changes of input voltage, but to a lesser degree. For example, a ten percent change in input voltage may result in a five percent change in the output of a saturated toroid provided with a silicon steel core. This latter change may even be as low as one percent. However, some compensation is necessary to provide that the output of saturated toroid 30 with the silicon steel core 35 will approximate that of a saturated toroid having a core of a square loop material of the nickel content type.

The input voltages to primary or input winding 33 of saturated toroid 30 is derived from a third secondary winding, such as the winding S2C provided on one of the transformers T. This winding S2C is a lower voltage winding than the other two windings and may, in the particular example illustrated, have an output voltage of 50 volts. The terminals of windings S2C are connected to the input terminals of winding 33 through conductors 36 and 37, one of which includes a resistance R1 in series therein.

The output of winding 34, which is the output of saturated toroid 30, is applied across two terminals of a full wave rectifier 40. To compensate for the voltage variation characteristic of the material of saturated core 35, a Zener diode Z2 is connected across the output diagonal of rectifier bridge 40 in series with an adjustable resistance R33 having an adjustable tap 41, the anode of Zener diode Z2 being connected through a diode D27 to the junction 41 of isolating diodes D24 and D25 and thus to reference bus 20. The cathode of Zener diode Z2 is connected to one terminal of the resistance R33.

Adjustments are made toward the higher end of resistance R33, which is the end more remote from the Zener diode Z2. By suitable adjustment of tap 41, the voltage variation characteristic of the material of core 35 of saturated toroid 30 can be fully compensated so that the voltage across the output diagonal 42–43 of rectifier 40 varies directly as a function of the frequency of the input voltage to saturated toroid 30.

With respect to the over-frequency control circuit, the emitter of transistor Tr–5 is connected to reference bus 20 through a conductor 44. The base of transistor Tr–5 is connected to the selector arm 46 of a switch SW–2 selectively engageable with the adjustable taps of resistances R30 and R31 connected in parallel with each other. This parallel resistance combination is connected, in series with the resistance R15 and parallel resistances R37 and R38, to a conductor 47 connected to adjustable tap 41 of resistance R33. In the manner as described in my co-pending application, switch SW–2, in association with adjustable resistances R30 and R31, is operable to select the range of frequency control.

With the emitter of the transistor Tr–5 connected to reference bus 20, under normal conditions this emitter is slightly positive with respect to the base of transistor Tr–5 and thus transistor Tr–5 is conductive. This blocks transistor Tr–6, whose base is connected to the collector of transistor Tr–5. Upon an increase in the frequency of the input voltage across winding 33 of saturated toroid 30, the voltage across diagonal 42–43 of full wave rectifier 40 becomes more positive so that the base of transistor Tr–5 becomes more positive with respect to its emitter and transistor Tr–5 ceases to conduct. This triggers transistor Tr–6 conductive to trigger unijunction transistor Tr–9 conductive and thus to gate rectifier SCR–1 to energize trip coil TC and open circuit breaker CB.

Turning now to the under-frequency control circuit, the base of transistor Tr–7 is connected to junction point 42 of full wave rectifier 40 through a conductor 48 and diode D27. The emitter of transistor Tr–7 is connected by a conductor 51 to the selector arm 52 of a switch SW–2 selectively engageable with the adjustable taps of an adjustable resistance R28 or an adjustable resistance R29. These resistances are connected in parallel with each other and, in series with a resistance R13, to a resistance R36 connected in parallel with series connect resistors R34 and R35 which are connected, through conductor 47, to tap 41 of adjustable resistance R33. The resistance network just described is provided to preselect the range of control for under-frequency monitoring through switch SW–3 and the adjustable resistors R28 and R29.

The under-frequency control circuit works in the following manner. The adjustments are such that normally the emitter of transistor Tr–7 is conductive and thus blocks transistor Tr–8. When the frequency of the input voltage applied to winding 33 of saturated toroid 30 decreases below a preselected value, the voltage across diagonal 42–43 of full wave rectifier 40 decreases and the emitter of transistor Tr–7 becomes less positive with respect to the base of this transistor. Thus, transistor Tr–7 ceases to conduct and triggers transistor Tr–8 conductive, as the base of transistor Tr–8 is connected to the collector of transistor Tr–7. When transistor Tr–8 conducts, it triggers unijunction transistor Tr–9 conductive to gate rectifier SCR–1 and thus energize trip coil TC of circuit breaker CB.

The several capacitors associated with the transistors shape the response time characteristic of the transistors. Other condensers, such as C6 and C8 are noise by-pass capacitors.

While a specific embodiment of the invention has been shown and described in detail to illustrate the application of the principles of the invention, it will be understood that the invention may be embodied otherwise departing from such principles.

What is claimed is:

1. A protective monitor operable to energize the trip coil of a circuit breaker to interrupt the supply of power from a source of polyphase A.C. power to a load responsive to variation of any phase voltage and variation of frequency, said monitor comprising, in combination, first sensing means connected to each phase of said load and operable, responsive to a variation, in either direction from a preselected value, of the load voltage in any phase and independently of the load voltage in the other phases, to provide a first output signal; second sensing means connected to said load and operable, independently of said first sensing means, responsive to variations in the load frequency from a preselected value, to provide a second output signal; a source of potential; switch means connected to said source of potential and to said trip coil and operable, when triggered, to connect said trip coil to said source of potential to trip said circuit breaker; and trigger means commonly connected to the outputs of both said first and second sensing means, and to said switch means, and operable, responsive to either of said output signals, to deliver an output trigger pulse to said switch means.

2. A protective monitor, as claimed in claim 1, in which said sensing means, said switch means and said trigger means comprise solid state circuitry components.

3. A protective monitor, as claimed in claim 1, in which said switch means is an SCR, said trigger means delivering a gating signal to said SCR responsive to either of said output signals.

4. A protective monitor, as claimed in claim 1, in which said source of potential comprises a condenser; and a condenser charging circuit connecting said condenser to said source of A.C. power.

5. A protective monitor, as claimed in claim 4, in which said charging circuit connects said condenser to said source of A.C. power through said circuit breaker.

6. A protective monitor, as claimed in claim 5, including a reference bus connected to said sensing means to supply reference potentials thereo; circuit means connecting said reference bus to said source of A.C. power through said circuit breaker to maintain said reference bus at a preselected reference potential, and also connecting said reference bus to said condenser; and means, including said condenser, operable to apply a reference potential to said reference bus after opening of said circuit breaker for at least a predetermined time interval to maintain at least one of said sensing means operable to supply an output signal to said trigger means.

7. A protective monitor, as claimed in claim 1, in which each of said sensing means comprises a transistor amplifier.

8. A protective device, as claimed in claim 3, in which said trigger means comprises a unijunction transistor.

9. A protective monitor, as claimed in claim 1, wherein said first sensing means comprises a first sensing device operable to provide an output signal responsive to an increase in the load voltage in any phase from said preselected value, and a second sensing device applicable to provide an output signal responsive to a decrease in the load voltage in any phase from said preselected value; said second sensing means comprising a third sensing device operable to provide an output signal responsive to an increase in the load frequency, and a fourth sensing device operable to supply an output signal responsive to a decrease in the load frequency.

10. A protective device, as claimed in claim 9, in which each of said sensing devices includes a first transistor having its input connected to said load, and a second transistor connected to the output of said first transistor; said first transistor being conductive when the load circuit parameter controlled thereby is at its preselected value, and blocking said second transistor; said first transistor being blocked responsive to a variation in the load parameter controlled thereby from its preselected value to trigger said second transistor conductive; said switch means comprising an SCR; and said trigger means comprising a unijunction transistor having its input commonly connected to the outputs of said second transistors and its output connected to the gate of said SCR.

11. A protective monitor, as claimed in claim 10, including a reference bus; means connected to said load and to said reference bus and operable to maintain the latter at a preselected relative potential; and respective range adjusting means each associated with one of said first transistors and connected to said load; the inputs of said first transistors being connected to the respective range adjusting means and to said reference bus.

12. A protective monitor, as claimed in claim 11, in which said means maintaining said reference bus at a predetermined selected relative potential comprises a Zener diode.

References Cited

UNITED STATES PATENTS

| | | | |
|---|---|---|---|
| 3,187,225 | 6/1965 | Mayer | 317—33 X |
| 3,243,658 | 3/1966 | Blackburn | 317—50 X |
| 3,255,384 | 6/1966 | Riebs | 317—33 X |
| 3,345,539 | 10/1967 | Ashenden et al. | 317—33 |

JOHN F. COUCH, *Primary Examiner.*

J. D. TRAMMELL, *Assistant Examiner.*

U.S. Cl. X.R.

317—31, 33, 151